United States Patent
Goyal et al.

(10) Patent No.: US 8,290,532 B1
(45) Date of Patent: Oct. 16, 2012

(54) SELECTIVELY CONDUCTING REVERSE-LINK POWER CONTROL AND CALL ADMISSION CONTROL

(75) Inventors: Anoop K. Goyal, Overland Park, KS (US); Bhagwan Khanka, Lenexa, KS (US); John W. Prock, Peculiar, MO (US)

(73) Assignee: Sprint Spectrum L.P., Overland Park, KS (US)

(*) Notice: Subject to any disclaimer, the term of this patent is extended or adjusted under 35 U.S.C. 154(b) by 328 days.

(21) Appl. No.: 12/763,203

(22) Filed: Apr. 19, 2010

(51) Int. Cl.
*H04B 7/00* (2006.01)

(52) U.S. Cl. ............ 455/522; 455/69; 455/70; 455/450; 455/451; 455/453; 370/318; 370/319; 370/320

(58) Field of Classification Search ............... 455/522, 455/69, 70, 450–453; 370/318–320
See application file for complete search history.

(56) References Cited

U.S. PATENT DOCUMENTS

| | | | |
|---|---|---|---|
| 5,475,861 A | 12/1995 | Hall | |
| 5,914,950 A | 6/1999 | Tiederman, Jr. et al. | |
| 6,154,638 A | 11/2000 | Cheng et al. | |
| 6,397,043 B1 | 5/2002 | Kang | |
| 6,597,923 B1 | 7/2003 | Vanghi et al. | |
| 6,671,512 B2 | 12/2003 | Laakso | |
| 6,757,537 B1 | 6/2004 | Choi et al. | |
| 6,944,449 B1 | 9/2005 | Gandhi et al. | |
| 7,054,275 B2 | 5/2006 | Kim et al. | |
| 7,072,630 B2 | 7/2006 | Lott et al. | |
| 7,194,281 B2 | 3/2007 | Peng et al. | |
| 7,215,653 B2 | 5/2007 | Kim et al. | |
| 7,280,510 B2 | 10/2007 | Lohtia et al. | |
| 7,280,511 B2 | 10/2007 | Ahn | |
| 7,315,573 B2 | 1/2008 | Lusky et al. | |
| 7,392,055 B2 | 6/2008 | Li | |
| 7,403,800 B2 | 7/2008 | Han et al. | |
| 7,466,682 B1 | 12/2008 | Ribas et al. | |
| 7,522,919 B2 | 4/2009 | Yoon et al. | |
| 7,609,635 B2 | 10/2009 | Bae et al. | |
| 7,636,322 B1 | 12/2009 | Gandhi et al. | |
| 7,668,561 B2 | 2/2010 | Au et al. | |
| 7,693,032 B2 | 4/2010 | Li et al. | |
| 7,813,323 B1 | 10/2010 | Talley et al. | |
| 7,852,810 B1 | 12/2010 | Talley et al. | |
| 2001/0019943 A1 | 9/2001 | Bender et al. | |
| 2002/0094837 A1 | 7/2002 | Hamabe et al. | |
| 2003/0064741 A1 | 4/2003 | Silva et al. | |
| 2003/0086405 A1 | 5/2003 | Silva et al. | |
| 2003/0134656 A1 | 7/2003 | Chang et al. | |

(Continued)

OTHER PUBLICATIONS

Non-Final Office Action from U.S. Appl. No. 12/026,236 mailed Feb. 2, 2011.

(Continued)

*Primary Examiner* — Fayyaz Alam (57) ABSTRACT

Methods and systems are provided for selectively conducting reverse-link power control and call admission control. In an embodiment, a base station identifies a set of mobile stations more likely than others to experience a dropped call. For each mobile station in the set, the base station relaxes at least one reverse-link power-control setting, to foster an increased actual and/or allowed reverse-link transmission-power level. The base station thereafter detects the dropped-call rate exceeding a first threshold, and responsively decreases the degree to which at least one setting was relaxed. The base station thereafter detects the dropped-call rate exceeding a higher threshold, and responsively drops at least one active call and/or blocks at least one new call.

25 Claims, 2 Drawing Sheets

U.S. PATENT DOCUMENTS

| | | |
|---|---|---|
| 2003/0143190 A1 | 7/2003 | Iyer et al. |
| 2003/0153272 A1 | 8/2003 | Takano |
| 2003/0206537 A1 | 11/2003 | Choi et al. |
| 2003/0231586 A1 | 12/2003 | Chheda |
| 2004/0047305 A1 | 3/2004 | Ulupinar |
| 2004/0146016 A1 | 7/2004 | Kim et al. |
| 2004/0176042 A1 | 9/2004 | Lott et al. |
| 2004/0193971 A1 | 9/2004 | Soong et al. |
| 2004/0213182 A1 | 10/2004 | Huh et al. |
| 2004/0241803 A1 | 12/2004 | Rosen et al. |
| 2005/0041612 A1 | 2/2005 | Zhang et al. |
| 2005/0107107 A1 | 5/2005 | Shahidi |
| 2005/0197080 A1 | 9/2005 | Ulupinar et al. |
| 2005/0201332 A1 | 9/2005 | Bakshi et al. |
| 2005/0233693 A1 | 10/2005 | Karaoguz et al. |
| 2005/0288053 A1 | 12/2005 | Gu |
| 2006/0045045 A1 | 3/2006 | Blessent et al. |
| 2006/0223444 A1 | 10/2006 | Gross et al. |
| 2006/0223565 A1 | 10/2006 | Gandhi et al. |
| 2006/0234638 A1 | 10/2006 | Mueckenheim et al. |
| 2006/0275782 A1 | 12/2006 | Gunderson et al. |
| 2007/0026884 A1 | 2/2007 | Rao |
| 2007/0129086 A1 | 6/2007 | Toone |
| 2007/0155395 A1 | 7/2007 | Gopalakrishnan et al. |
| 2007/0191044 A1* | 8/2007 | Kostic et al. ................. 455/522 |
| 2007/0270100 A1 | 11/2007 | Agrawal et al. |
| 2008/0084841 A1 | 4/2008 | Kim et al. |
| 2008/0137604 A1 | 6/2008 | Lee |
| 2010/0178907 A1 | 7/2010 | Oroskar et al. |

OTHER PUBLICATIONS

Final Office Action from U.S. Appl. No. 12/026,236 mailed Jun. 22, 2011.

Non-Final Office Action from U.S. Appl. No. 12/179,744 mailed May 19, 2011.

Notice of Allowance mailed Sep. 29, 2011 for U.S. Appl. No. 12/179,744.

Unpublished U.S. Appl. No. 11/558,337, entitled "Dynamic Adjustment of EV-DO Reverse-Link Transitional Probabilities," filed Nov. 9, 2006 in the name of inventor Andrew Wurtenberger.

Unpublished U.S. Appl. No. 11/619,348, entitled "Dynamic Adjustment of Forward-Link Frame-Error-Rate (FFER) Target," filed Jan. 3, 2007 in the name of inventor Ryan S. Talley et al.

Unpublished U.S. Appl. No. 11/762,534, entitled "Dynamic Adjustment of Reverse-Link Frame-Error-Rate (RFER) Target Based on Reverse-Link RF Conditions," filed Jun. 13, 2007 in the name of inventor Ryan S. Talley et al.

Unpublished U.S. Appl. No. 12/026,236, entitled "Dynamic Adjustment of Target Frame Error Rate," filed Feb. 5, 2008 in the name of Manghat et al.

Unpublished U.S. Appl. No. 12/179,744, entitled "Conducting Power Control Based on Reverse-Link RF Conditions," filed Jul. 25, 2008 in the name of inventor Manoj Shetty et al.

Unpublished U.S. Appl. No. 12/763,206, filed Apr. 19, 2010 in the name of Khanka et al., entitled "Identifying and Selectively Conducting Reverse-Noise Contribution on a Per-Access-Terminal Basis,".

Non-Final Office Action from U.S. Appl. No. 11/558,337, mailed May 29, 2009.

Non-Final Office Action from U.S. Appl. No. 11/619,348, mailed May 26, 2009.

Final Office Action from U.S. Appl. No. 11/619,348, mailed Oct. 29, 2009.

Non-Final Office Action from U.S. Appl. No. 11/558,337, mailed Dec. 16, 2009.

Non-Final Office Action from U.S. Appl. No. 11/762,534, mailed Feb. 4, 2010.

Non-Final Office Action from U.S. Appl. No. 11/619,348, mailed Mar. 25, 2010.

Unpublished U.S. Appl. No. 10/910,835, entitled "Dynamic Power Rail Configuration in a Wireless CDMA Communication System," filed Aug. 4, 2004 in the name of Ribas et al.

Non-Final Office Action from U.S. Appl. No. 10/910,835, mailed Nov. 19, 2007.

Final Office Action from U.S. Appl. No. 10/910,835, mailed Jun. 13, 2008.

Advisory Action from U.S. Appl. No. 10/910,835, mailed Aug. 19, 2008.

Published Abstract of Hoe et al., KR20040099837, publication date Dec. 2, 2004, entitled "Method for Controlling the Data Rate of a Mobile Communication System, Particularly for Allowing a Base Station to Change a Data Rate Transition Probability and Transmit It to Mobile Terminal to Effectively Control Each Transmission Data Rate of the Mobile Terminals."

Hye Jeong Lee, "New Rate Control Scheme Based on Adaptive rateLimit for 1xEV-DO Reverse Link Traffic Channels Communications Letters," vol. 9, No. 10, Oct. 2005.

Woo Young Yeo, "An Analytical Model for Reverse Link Rate Control in cdma2000 1xEV-DO Systems," IEEE Communications Letters, vol. 9, No. 3, Mar. 2005.

Esa Tiirola, "Performance of a UMTS Uplink MIMO Scheme," IEEEplore 2003.

Ridha Nasri, "Achieving a high uplink capacity and coverage by using multicariers in 3G-WCDMA Systems," 2004 IEEE.

Final Office Action from U.S. Appl. No. 11/558,337 mailed Jun. 1, 2010.

Notice of Allowance from U.S. Appl. No. 11/762,534 mailed Jun. 3, 2010.

Notice of Allowance from U.S. Appl. No. 11/619,348 mailed Aug. 19, 2010.

* cited by examiner

SELECTIVELY CONDUCTING REVERSE-LINK POWER CONTROL AND CALL ADMISSION CONTROL

CROSS-REFERENCE TO RELATED APPLICATIONS

This application hereby incorporates by reference in its entirety and for all purposes the disclosure of the contemporaneously-filed U.S. patent application Ser. No. 12/763,206 filed in the name of Khanka et al. and entitled "Identifying and Selectively Controlling Reverse-Noise Contribution on a Per-Access-Terminal Basis".

BACKGROUND

1. Technical Field

The present disclosure relates to wireless networks, and, more particularly, to managing transmission power between mobile stations and base stations.

2. Description of Related Art a. Cellular Wireless Networks Generally

Many people use mobile stations, such as cell phones and personal digital assistants (PDAs), to communicate with cellular wireless networks. These mobile stations and networks typically communicate with each other over a radio frequency (RF) air interface according to a wireless communication protocol such as Code Division Multiple Access (CDMA), perhaps in conformance with one or more industry specifications such as IS-95 and IS-2000. Wireless networks that operate according to these specifications are often referred to as "1xRTT networks" (or "1x networks" for short), which stands for "Single Carrier Radio Transmission Technology." These networks typically provide communication services such as voice, Short Message Service (SMS) messaging, and packet-data communication.

Mobile stations typically conduct these wireless communications with one or more base transceiver stations (BTSs), each of which send communications to and receive communications from mobile stations over the air interface. Each BTS is in turn communicatively connected with an entity known as a base station controller (BSC), which (i) controls one or more BTSs and (ii) acts as a conduit between the BTS(s) and one or more switches or gateways, such as a mobile switching center (MSC) and/or packet data serving node (PDSN), which may in turn interface with one or more signaling and/or transport networks.

As such, mobile stations can typically communicate with one or more endpoints over the one or more signaling and/or transport networks from inside one or more coverage areas (such as cells and/or sectors) of one or more BTSs, via the BTS(s), a BSC, and an MSC and/or PDSN. In typical arrangements, MSCs interface with the public switched telephone network (PSTN), while PDSNs interface with one or more core packet-data networks and/or the Internet.

Service providers have also introduced mobile stations and wireless networks that communicate using a CDMA protocol known as EV-DO, which stands for "Evolution Data Optimized." EV-DO networks, operating in conformance with one or more releases and/or revisions of industry specification IS-856, such as Release 0 and Revision A, both of which are hereby incorporated herein by reference, provide high rate packet-data service (including Voice over IP (VoIP) service) to mobile stations using a combination of time-division multiplexing (TDM) on the forward link (from the network to mobile stations) and more conventional CDMA technology on the reverse link (from mobile stations to the network). Furthermore, some "hybrid" mobile stations can communicate with both 1x networks and EV-DO networks.

In the EV-DO context, a mobile station is typically referred to as an access terminal, while the network entity (i.e., the base station) with which the access terminal communicates over the air is known as an access node, which typically includes a device known as a radio network controller (RNC), which is similar to a BSC in 1x networks. The access node also includes one or more BTSs, each including one or more antennas that radiate to define wireless coverage areas such as cells and sectors. Note that sectors are used in the balance of this written description as an example of a wireless coverage area, though this is for explanation and not to the exclusion of cells or other coverage areas. Among other functions, the RNC controls one or more BTSs, and serves as a conduit between the BTSs and a PDSN, which provides access to a packet-data network. Thus, when positioned in a sector provided by an access node, an access terminal may communicate over the packet-data network via the access node and the PDSN.

b. Reverse-Link Power Control i. The Power Control Bit (PCB) and the Ratio $E_b/N_t$ In CDMA networks, the transmitting power of a mobile station on the reverse link of a traffic channel at any given moment is based on a number of mechanisms, two of which are known as the power control bit (PCB) and the ratio $E_b/N_t$. The PCB is a bit (0 or 1) that the base station sends to the mobile station on the forward link quite frequently, on the order of 800 times per second (i.e., once every 1.25 ms). The mobile station repeatedly responsively adjusts its transmission power to the base station on the reverse link. Typically, if the base station sends a PCB equal to 0, the mobile station will decrease the power by a set decrement, such as 1 dB, whereas if the base station sends a PCB equal to 1, the mobile station will increase the power by a set increment, which may also be 1 dB. Using these example numbers, the mobile station's reverse-link transmission power would change by plus or minus 1 dB every 1.25 ms.

Each such 1.25-ms cycle, a typical base station determines whether to transmit a PCB equal to 0 or 1 to a given mobile station by comparing (i) a signal-to-noise ratio that the base station computes for that mobile station with (ii) a stored threshold value for that signal-to-noise ratio that the base station maintains on a per-mobile-station basis. This ratio is known as and referred to herein as $E_b/N_t$, while the threshold is referred to herein as the "$E_b/N_t$ setpoint."

$E_b/N_t$ is a ratio of (i) the strength ($E_b$ for "energy per bit") at which the base station receives the reverse link from the mobile station to (ii) the strength ($N_t$ for "noise") at which the base station is receiving signals from all other sources on the sector/carrier on which the mobile station is operating (where a sector/carrier is an instance of a given carrier frequency on which the base station provides service in a given sector, though coverage areas other than sectors could be used in various implementations). $E_b/N_t$, then, is a signal-to-noise ratio for the reverse-link part of a traffic channel. As stated, the base station typically computes $E_b/N_t$ at the same frequency at which it transmits the PCBs, which again may be once every 1.25 ms.

In typical operation, then, for a given mobile station (and in fact for each mobile station the base station is serving), every 1.25 ms, the base station compares the most recently computed $E_b/N_t$ for that mobile station with the $E_b/N_t$ setpoint for that mobile station. If the $E_b/N_t$ exceeds the setpoint, the base station is receiving a strong enough signal from the mobile station, and thus the base station transmits a PCB of 0, causing the mobile station to decrement its reverse-link power. If, however, the $E_b/N_t$ is less than the setpoint, the base station is not receiving a strong enough signal from that mobile station, and thus the base station transmits a PCB of 1, causing the mobile station to increment its reverse-link power.

Thus, a mobile station's reverse-link transmission power typically stabilizes on the traffic channel after some time to a point that achieves an $E_b/N_t$ (as measured at the base station) that is near the mobile station's $E_b/N_t$ setpoint, which can be changed during operation. Furthermore, a network typically operates using configurable parameters corresponding to initial, minimum-allowed, and maximum-allowed values for the $E_b/N_t$ setpoint for each mobile station, further shaping the reverse-link transmission-power behavior of the mobile stations.

ii. Reverse-Link Frame Error Rate (RFER)

Using 1x networks by example, data is transmitted on the air interface in units known as frames, which typically last 20 ms. Some reverse-link frames received by the base station contain no errors, while some frames do contain errors as a result of imperfect transfer from the mobile station, and some are not received at all. The reverse-link frame error rate (RFER), then, is a ratio, computed per mobile station by the base station over a given time period of (i) the number of error-containing and missing frames from each mobile station to (ii) the total number of frames that the base station should receive from that respective mobile station. Other things being more or less equal, the more power the mobile station uses to transmit to the base station, the lower the mobile station's RFER will be.

At approximately the same frequency at which the base station is receiving reverse-link frames (i.e., once every 20 ms) from a mobile station, the base station computes a RFER for that mobile station over some previous number of frames, e.g., 20, 100, 200, etc. Thus, on a frame-by-frame basis, the base station computes a RFER for some rolling window of previous frames. Furthermore, each time the base station computes the RFER for that respective mobile station, the base station compares that computed value with a threshold: a parameter often and herein referred to as the "RFER target," which may be around 2%.

If the RFER for that mobile station exceeds the RFER target, the base station is receiving too many error-containing frames and/or missing too many frames from that mobile station, and thus the base station will responsively increase the $E_b/N_t$ setpoint for that mobile station. In the short term, this will result in the base station's computed $E_b/N_t$ for that mobile station falling below the new, higher setpoint, which in turn will result in the base station repeatedly sending PCBs of 1 to the mobile station. This, in turn, will result in the mobile station increasing its reverse-link transmission power, which will then typically stabilize at a level that will result in the base station computing an $E_b/N_t$ for that mobile station that is close to the new, higher $E_b/N_t$ setpoint, and perhaps result in an acceptable RFER for that mobile station.

If, on the other hand, the RFER falls below the RFER target, the mobile station may be using excessive power on the reverse-link—in essence, the base station may be receiving a signal from that mobile station that may be considered too strong, perhaps at the expense of that mobile station's battery life, and perhaps creating excessive noise on the sector/carrier. If that occurs, and perhaps only if it holds for a specified period of time, the base station may decrease the $E_b/N_t$ setpoint for that mobile station, resulting in the short term in the $E_b/N_t$ computed by the base station repeatedly exceeding the new, decreased setpoint, resulting in the base station repeatedly sending PCBs of 0 to the mobile station. This will result in the mobile station decreasing its reverse-link transmission power, which should then stabilize at a level that will result in the base station computing an $E_b/N_t$ that is close to the new, decreased $E_b/N_t$ setpoint.

The base station's repeated calculation of the RFER for a mobile station and comparison with the mobile station's current RFER target results in the base station iteratively adjusting the $E_b/N_t$ setpoint for that mobile station. In turn, the base station's even-more-frequent calculation of the mobile station's $E_b/N_t$ and comparison with the mobile station's current $E_b/N_t$ setpoint causes the base station to iteratively send PCBs of 0 (for less power) or 1 (for more power) to the mobile station, which cause the mobile station to accordingly adjust its reverse-link transmission power on the traffic channel. This calibration process is conducted in an attempt to keep the RFER calculated by the base station and associated with the mobile station at or just below what is deemed to be an acceptable threshold, which again may be around 2%.

Different situations may occur on a sector/carrier at different times. For one, the number of mobile stations using traffic channels can vary between just a few, such as 10, to a larger number, such as 30, and perhaps approach an upper bound (e.g., 61 assuming 1×RTT CDMA RC3). And, as stated, the power that the mobile stations use for transmission to the base station can vary. That is, variables such as terrain, weather, buildings, other mobile stations, other interference, and distance from the base station, among others, can affect the RFER that the base station measures for a given mobile station, and thus the amount of power the mobile station uses on the reverse link. Using too much power can drain battery life, and it may sometimes be the case that a mobile station reaches its maximum transmission power and still cannot achieve an acceptable RFER, in which case it may not be able to communicate with the base station.

Note that, in some implementations, a ratio other than $E_b/N_t$ may be used. In particular, each mobile station, when operating on a traffic channel, may also transmit on the reverse-link on what is known as a reverse pilot channel. The base station may then compute a ratio known as $E_c/I_o$ for that mobile station, which would be a ratio of (i) the power level ("$E_c$" for "energy per chip") at which the base station is receiving the reverse pilot channel and (ii) the power level ("$I_o$") at which the base station is receiving all transmissions (including the reverse pilot channel) on the sector/carrier on which the mobile station is operating. The base station would then operate with respect to $E_c/I_o$ as described above with respect to $E_b/N_t$. And certainly other power-control mechanisms are used in the art.

iii. Reverse Noise Rise (RNR)

As stated, in general, interference can be—and often is—present on the reverse link of a sector/carrier, as a base station will receive transmissions not only from mobile stations that are operating on that sector/carrier, but will also often receive transmissions on that frequency from other mobile stations, other devices, and/or any other sources of interference on that frequency in that area. At any given moment, the sum total of what a base station is receiving on a sector/carrier—from mobile stations operating on that sector/carrier, as well as from all other sources—is known as the "reverse noise" on the sector/carrier.

Quite frequently (e.g., once per frame (each of which may last 20 ms)), base stations compute a value known as "reverse noise rise" (RNR) for a given sector/carrier, which is the difference between (i) the reverse noise that the base station is currently detecting on the sector/carrier and (ii) a baseline level of reverse noise for the sector/carrier. Thus, the base station computes how far the reverse noise has risen above that baseline.

For the baseline level, CDMA networks may use a value such as the lowest measurement of reverse noise on the sector/carrier in the previous 24 hours, or perhaps an average of the 24-hour lows over the previous week, or some other suitable value. And some networks, including EV-DO networks, may periodically use what is known as a silent interval, which is a coordinated time period during which mobile stations do not transmit anything to the base station. The base station can then measure whatever else is out there. In that case, the baseline level would correspond to the amount of reverse noise that is present when the sector/carrier is unloaded. And other reverse-link-noise levels could be used as a baseline.

Other things being more or less equal, the lower the RNR is at a given moment, the more favorable the RF environment is for communication between mobile stations and the base station at that time. As one would expect, the higher the RNR is at a given moment, the less favorable the RF environment is at that time. Also, a low RNR generally corresponds to a sector/carrier being lightly loaded, in other words that is supporting communications for a relatively low number of mobile stations. A high RNR, again as one might expect, generally corresponds to a sector/carrier being heavily loaded, in other words that is supporting communications for a relatively high number of mobile stations.

Overview

According to the present disclosure, a base station in a wireless network monitors those mobile stations that are currently engaged in communication sessions (voice calls, data sessions, etc.) on a traffic channel (i.e., that are "active") to identify the one or more of those active mobile stations that are currently most likely to suffer a dropped call, which is an event that network operators typically try to avoid or at least minimize. In some embodiments, this identification may involve a determination—with respect to one or more of the active mobile stations—of a respective per-mobile-station contribution to the RNR that the base station is currently measuring on the sector/carrier over which the active mobile stations are conducting their sessions.

In general, other things being more or less equal, if a mobile station is making a relatively high individual contribution to the overall RNR on the sector/carrier, this would indicate that the mobile station is struggling, and that it would have a relatively high probability of having its ongoing call (used throughout to refer to communication sessions of all types) dropped. Conversely, other things being more or less equal, if a mobile station is making a relatively low individual contribution to the overall RNR on the sector/carrier, this would indicate that the mobile station would have a relatively low probability of having is ongoing call dropped.

In some embodiments, one or more determinations of per-mobile-station contributions to RNR may involve the round-robin process disclosed in the co-pending and contemporaneously-filed U.S. Patent Application referenced above, which as stated above is fully incorporated herein by reference. In some embodiments, one or more determinations of per-mobile-station contributions to RNR may involve considering mobile stations having a high $E_b/N_t$ (or $E_b/N_o$, which is similar to $E_b/N_t$, and known to those in the art, or $E_c/I_o$, etc.) to be contributing more to RNR than mobile stations having a low $E_b/N_t$ (or $E_b/N_o$, $E_c/I_o$, etc.). Furthermore, one or more of these determinations may involve considering mobile stations having high setpoints with respect to one or more of $E_b/N_t$, $E_b/N_o$, $E_c/I_o$, etc. to be contributing more to RNR than mobile stations having low setpoints for one or more such ratios. And PCB behavior (such as sending a sufficiently long sequence of consecutive is to a given mobile) could be considered as well.

In some embodiments, one or more determinations of per-mobile-station contributions to RNR may involve considering mobile stations having a low RFER (or RFER target in networks where RFER targets are dynamically changeable as well) to be contributing more to RNR than mobile stations having a high RFER (or RFER target). Recall that achieving a low RFER would, other things being more or less equal, require more reverse-link transmission power than would achieving only a higher RFER. And it should be explicitly noted that any of these factors that have been described as ways to compute per-mobile-station contributions to RNR could be used on their own (or in some combination) to identify the one or more active mobile stations that are most likely to experience a dropped call, without making a conversion to RNR contribution, and perhaps without making a calculation of RNR contribution at all.

In embodiments where a per-mobile-station contribution to RNR for one or more mobile stations is determined, the identification of the one or more active mobile stations that are most likely to experience a dropped call may involve comparing one or more RNR contributions to an expected average contribution. This expected value may be determined using what is known as the loading equation, which is used to determine an expected overall RNR on a sector/carrier at a particular time based on the current and maximum-possible numbers of active mobile stations on the sector/carrier. If "Current" and "Max" are used to represent these two values, the loading equation can be expressed as Expected RNR=10*log(1/(1−(Current/Max))). And the value (Current/Max) is also known as the "loading fraction." If this Expected RNR is then divided by the current number of active users, an expected per-mobile-station contribution to RNR can be determined. In some embodiments, those mobile stations having an actual contribution that exceeds this expected per-mobile-station contribution may be those that are identified as the one or more active mobile station most likely to experience a dropped call.

In some embodiments, the identification of the one or more active mobile stations that are most likely to experience a dropped call may involve assessing the state of the mobile stations' forward-link component of their traffic channels, as this can be indicative of the probability or likelihood of experiencing a dropped call as well. The above considerations could be applied equally to the forward link, though the mobile stations would need to respectively make reports of information about forward-link quality that would enable the base station to identify the one or more active mobile stations most likely to experience a dropped call. The assessment of the forward link could include assessments of the forward-link equivalents of the above-referenced concepts of $E_b/N_t$ (and/or other similar ratio(s)), forward-link frame error rate (FFER), FFER target, PCB behavior, etc. Also, the number and/or frequency of respective mobile stations sending negative acknowledgements to the base station could be factored in as well, as could one or more other forward-link metrics instead of or in addition to one or more described above.

Once the base station has identified the one or more active mobile stations most likely to suffer a dropped call, the base station relaxes one or more reverse-link power-control settings for each mobile station in that identified set. For each such mobile station, this may involve any number of changes to one or more of these settings, each of which is designed to cause the mobile station to ramp up reverse-link transmission power in an effort to prevent their respective call from being dropped. As examples, possible changes to such settings may include one or more of lowering the RFER target, raising the $E_b/N_t$ (or other similar signal-to-noise ratio) setpoint, raising the maximum-allowed $E_b/N_t$ (or other similar signal-to-noise ratio) setpoint. In some embodiments, one or more settings may be more aggressively changed for some mobile stations in the identified set as compared with others; in some such embodiments, the degree to which one or more settings are changed is commensurate with the probability of a dropped call.

While these changes are designed to have the desired effect of preventing the calls being conducted by the mobile stations in the identified set from being dropped, the fact that these one or more mobile stations are being encouraged (i.e. instructed, allowed, etc.) to increase their respective reverse-link transmission power will likely cause the overall RNR on the sector/carrier on which these mobile stations are operating to increase, which itself may result in an increased incidence of dropped calls on a sector/carrier-wide basis. So after making the changes described above to relax one or more reverse-link power-control settings for the one or more mobile stations in the identified set, the base station monitors the dropped-call rate (i.e. the number of dropped calls per some configurable time period, perhaps using a rolling-window approach such as described above with respect to the RFER) on the sector/carrier as a whole.

If the base station detects that the dropped-call rate rises above a first dropped-call-rate threshold, the base station responsively decreases the degree to which at least one of the one or more of the previously-adjusted reverse-link power-control settings are relaxed with respect to the value to which those one or more settings were set prior to the above-described adjustment. In other words, the base station attempts to slow or perhaps even stop or reverse the increasing of the dropped-call rate. After the base station makes the above-described second adjustment to one or more reverse-link power-control settings for each mobile station in the identified set, the base station continues to monitor the dropped-call rate on the sector/carrier.

If the base station then determines that the dropped-call rate has now exceeded a second, higher dropped-call rate threshold, the base station, in an effort to improve the overall state of the reverse link and maximize the number of active users, responds by selectively (i) dropping at least one active call and/or (ii) blocking (i.e., denying) at least one request for a new call (e.g., call-origination requests, inbound-handoff requests, etc.).

The base station may select a mixture of drops and blocks based on an assessment of how many (i.e., percentage, fraction, number, etc.) of the active mobile stations on the sector/carrier are non-problematic (i.e. "quality users") as compared with how many are problematic users, based on one or more of the factors (e.g., per-mobile-station contribution to sector/carrier-wide RNR) used to compile the identified set, perhaps according to the same or different threshold or thresholds. In some embodiments, the mixture of drops and blocks is determined at least in part by how many mobile stations are in the above-described identified set. In some embodiments, one or more of these factors (e.g. highest RNR contribution) is used to select which calls to drop.

In some embodiments, the higher the ratio of non-problematic active mobile stations to problematic active mobile stations, the higher the base station's ratio of blocks to drops will be. And conversely, in some embodiments, the higher the ratio of problematic active mobile stations to non-problematic active mobile stations, the higher the base station's ratio of drops to blocks will be. Whatever the mix, the base station may operate in cycles of, for example, x drops and y blocks, where x and y could be equal or not equal. Thus, the base station may simply alternate between drops and blocks, or the base station may conduct 2 or 3 drops for each block, or 1 drop for every 2 or 3 blocks, and so on. Clearly many different examples are possible.

In some embodiments, one or more mobile stations on the sector/carrier other than those in the identified set may have one or more reverse-link settings determined according to one or more of the considerations that are disclosed herein for including mobile stations in the identified set. For example, in a given implementation, one or more reverse-link power-control settings may be set on a real-time basis for every mobile station active at a given time on a given sector/carrier, based at least in part on per-mobile-station contribution to RNR, and the herein-described approach of relaxing one or more of those settings for some number of the highest contributors to RNR in an effort to prevent their calls from being dropped could be carried out as a dynamic adjustment to that general approach being inadequate in some instances.

And it should be noted that more than one base station in a given network may carry out the functions disclosed herein, and that one or more base stations may carry out those functions on a simultaneous or substantially-simultaneous basis with respect to multiple carriers in a given coverage area, such as a cell or sector.

In general, the above overview is intended to be illustrative and not limiting. Additional and/or different features may be present in some embodiments. And description of a network operating according to CDMA or EV-DO is by way of example, as any suitable protocol(s) may be used, such as iDEN, TDMA, AMPS, GSM, GPRS, UMTS, EDGE, WiMax (e.g., IEEE 802.16), LTE, microwave, satellite, MMDS, Wi-Fi (e.g., IEEE 802.11), Bluetooth, infrared, and/or any other now known or later developed.

BRIEF DESCRIPTION OF THE DRAWINGS

Various exemplary embodiments are described herein with reference to the following drawings, wherein like numerals denote like entities.

DETAILED DESCRIPTION OF EXEMPLARY EMBODIMENTS

1. Exemplary Architecture

Figure 1:
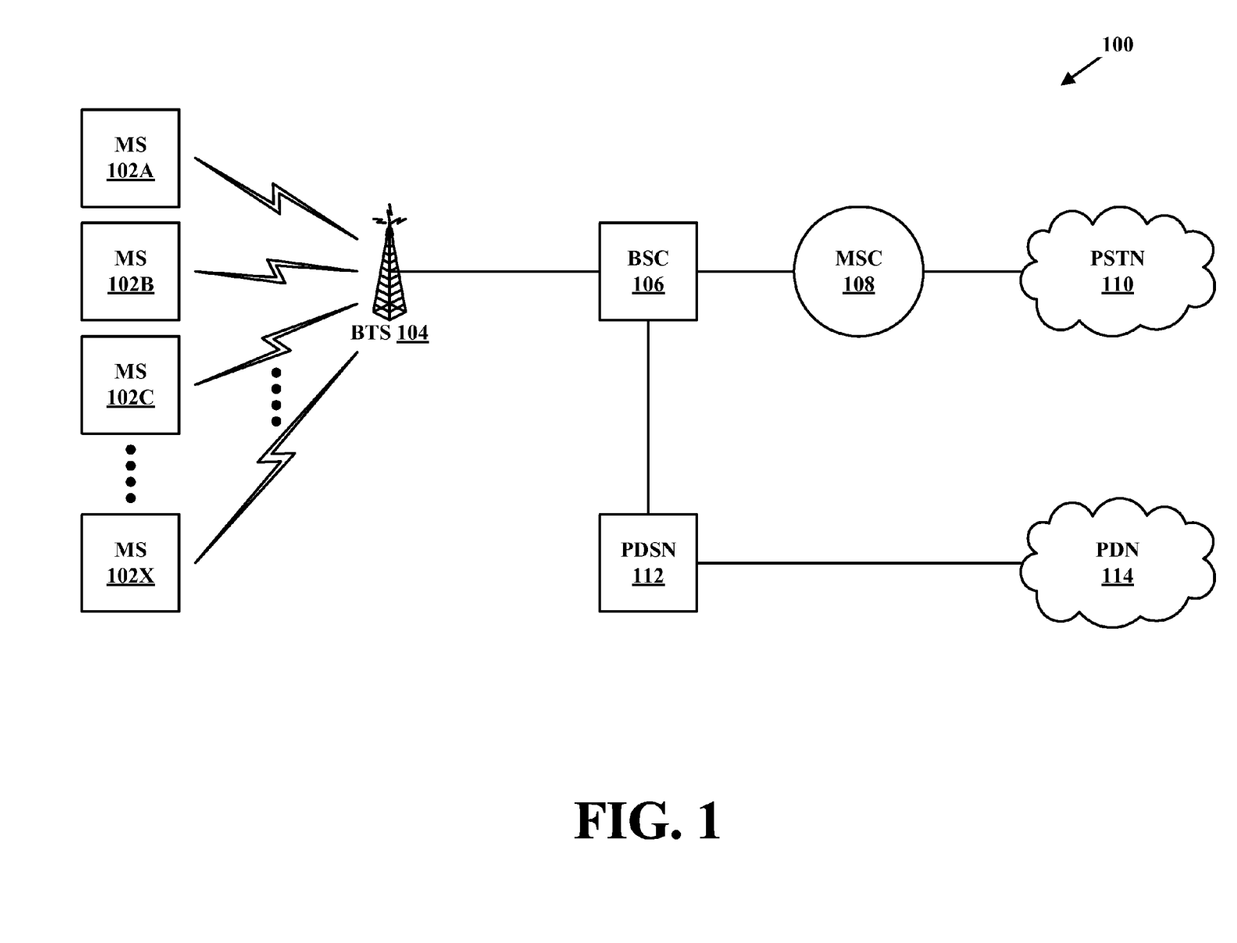
FIG. 1 is a simplified block diagram of a communication system, in which at least one embodiment may be carried out.

FIG. 1 is a simplified block diagram of a communication system, in accordance with at least one embodiment. It should be understood that this and other arrangements described herein are set forth only as examples. Those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. Various functions may be carried out by a processor executing instructions stored in memory.

FIG. 1 depicts a communication system 100 that includes a plurality of mobile stations 102A-102x(where 'X' denotes that the plurality could include any number of mobile stations, and is not meant to convey the specific number corresponding to the number of letters A-X), a BTS 104, a BSC 106, an MSC 108, the PSTN 110, a PDSN 112, and a packet-data network (PDN) 114. And additional entities could be present as well. For example, there could be any number of mobile stations in communication with BTS 104; furthermore, there could be additional entities in communication with PSTN 110 and/or PDN 114. Also, there could be one or more devices and/or networks making up at least part of one or more of the communication links. For example, there could be one or more routers, switches, or other devices or networks on the link between PDSN 112 and PDN 114.

Each mobile station 102 may be or include any mobile device arranged to carry out the mobile-station functions described herein, and as such may include a user interface, a wireless-communication interface, a processor, and data storage containing instructions executable by the processor for carrying out those mobile-station functions. The user interface may include buttons, a touch-screen, a microphone, and/or any other elements for receiving inputs, as well as a speaker, one or more displays, and/or any other elements for communicating outputs.

The wireless-communication interface may include an antenna and a chipset for communicating with one or more base stations over an air interface. As an example, the chipset could be suitable for CDMA communication. The chipset or wireless-communication interface in general may also or instead be able to communicate according to one or more other protocols mentioned herein and/or any others now known or later developed. The processor and data storage may be any suitable components known to those in the art. As examples, each mobile station 102 could be or include a cell phone, a PDA, a computer, a laptop computer, a hybrid CDMA/EV-DO device, and/or a multi-mode cellular/Wi-Fi device.

BTS 104 may be any network element arranged to carry out the BTS functions described herein. As such, BTS 104 may include a communication interface, a processor, and data storage containing instructions executable by the processor to carry out those BTS functions. The communication interface may include one or more antennas, chipsets, and/or other components for providing one or more CDMA coverage areas such as cells and sectors, for communicating with mobile stations over an air interface. The communication interface may also or instead be arranged to communicate according to one or more other protocols mentioned herein and/or any others now known or later developed, and may include one or more wired and/or one or more wireless interfaces for communicating with at least BSC 106.

BSC 106 may be any network element arranged to carry out the BSC functions described herein. As such, BSC 106 may include a communication interface, a processor, and data storage containing instructions executable by the processor to carry out those BSC functions. The communication interface may include one or more wired and/or one or more wireless interfaces for communicating with at least BTS 104, MSC 108, and PDSN 112. In general, BSC 106 functions to control one or more BTSs such as BTS 104, and to provide one or more BTSs such as BTS 104 with connections to devices such as MSC 108 and PDSN 112.

The combination of BTS 104 (or multiple BTSs) and BSC 106 may be considered a base station (i.e. access node). However, BTS 104 or BSC 106 could, taken alone, be considered a base station as well. Furthermore, a base station may be considered to be either or both of those devices, and perhaps make use of one or more functions provided by MSC 108, PDSN 112, and/or any other entity, without departing from the scope or spirit of the present disclosure.

MSC 108 may be any networking element arranged to carry out the MSC functions described herein. As such, MSC 108 may include a communication interface, a processor, and data storage containing instructions executable by the processor to carry out those MSC functions. The communication interface may include one or more wired and/or one or more wireless interfaces for communicating with at least BSC 106 and PSTN 110. In general, MSC 108 functions as a switching element between PSTN 110 and one or more BSCs such as BSC 106, facilitating communication between mobile stations and PSTN 110, which may be the well-known public switched telephone network.

PDSN 112 may be any networking element arranged to carry out the PDSN functions described herein. As such, PDSN 112 may include a communication interface, a processor, and data storage containing instructions executable by the processor for carrying out those PDSN functions. The communication interface may include one or more wired and/or one or more wireless interfaces for communicating with at least BSC 106 and PDN 114. In general, PDSN 112 functions as a network access server between PDN 114 and BSCs such as BSC 106, facilitating packet-data communication between mobile stations and PDN 114.

PDN 114 may include one or more wide area networks, one or more local area networks, one or more public networks such as the Internet, one or more private networks, one or more wired networks, one or more wireless networks, and/or one or more networks of any other type. Devices in communication over PDN 114 may exchange data using a packet-switched protocol such as the Internet Protocol (IP), and may be identified by an address such as an IP address.

2. Exemplary Operation

Figure 2:
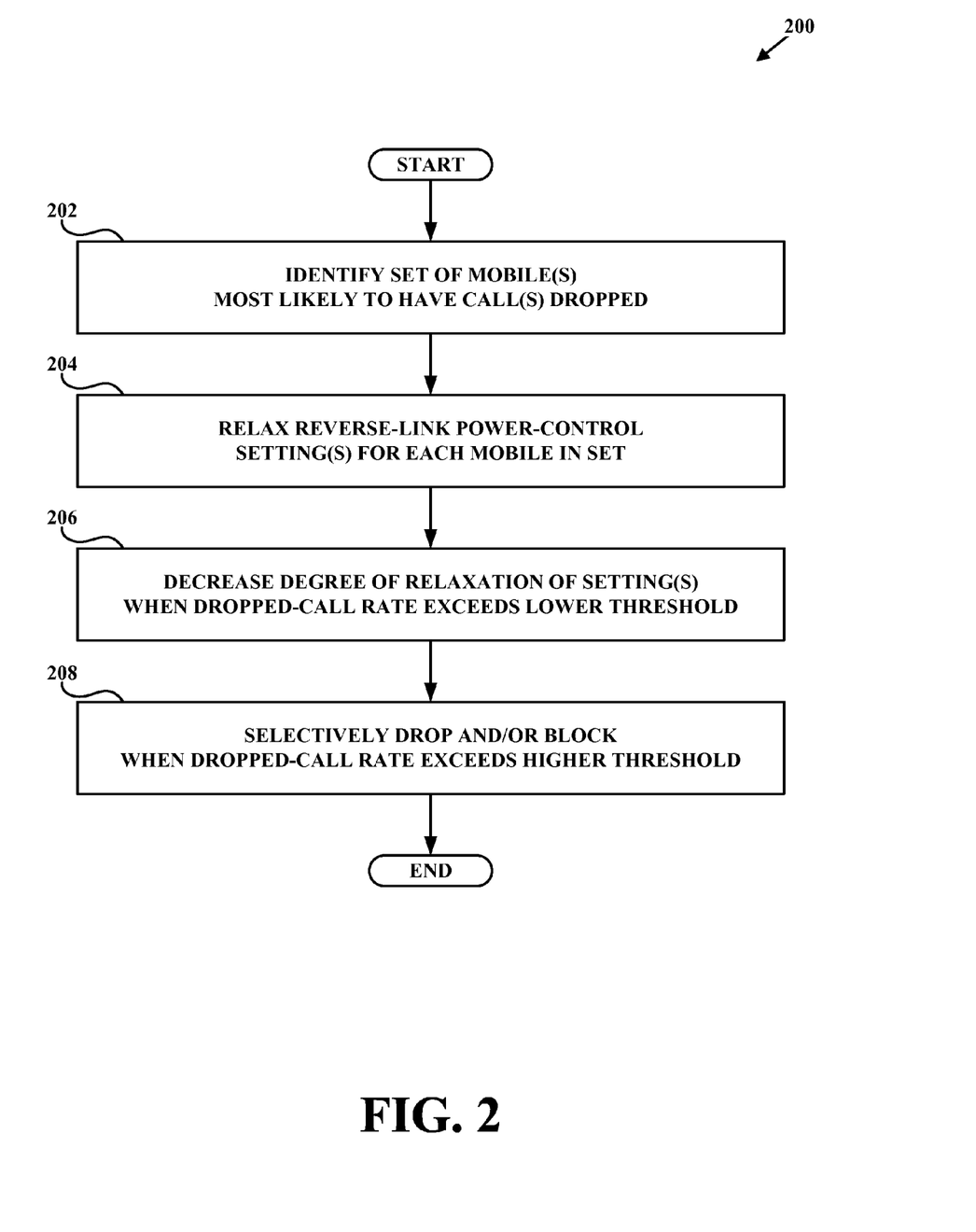
FIG. 2 is a flowchart of a method, in accordance with at least one embodiment.

FIG. 2 depicts a method 200, in accordance with at least one embodiment. And though method 200 is described as being carried out by BTS 104, the method could be carried out by BTS 104 in cooperation with one or more other entities such as BSC 106, and generally by any one or any combination of network entities described herein and/or known in the art. Further, method 200 could be carried out substantially simultaneously and/or at different times by different base stations, and by the same base station with respect to different coverage areas and/or carriers. And many other permutations are possible.

As shown in FIG. 2, method 200 begins at step 202, when BTS 104 identifies a set of one or more active mobile stations—to which BTS 104 is providing service on a carrier in a coverage area—that are more likely to experience a dropped call than are a remainder of active mobile stations on the carrier in the coverage area, which may be a sector or cell, as examples.

In an embodiment, identifying the set involves determining an individual contribution of at least one active mobile station to an overall RNR on the carrier in the coverage area, where active mobile stations having a relatively high individual contribution are included in the set. And determining the individual contribution of at least one active mobile station to the overall RNR may involve measuring at least one permobile-station contribution to RNR using a round-robin process such as that disclosed in the above-referenced co-pending and contemporaneously-filed U.S. Patent Application. And other methods may certainly be used as well or in addition, such as consideration of any air-interface metrics discussed herein. In some embodiments, a determined individual contribution of at least one active mobile station to the overall RNR may be compared with an expected average individual contribution of each active mobile station, where the expected value may be determined as discussed above using the loading equation.

In an embodiment, identifying the set involves determining a signal-to-noise ratio for at least one active mobile station, where active mobile stations having a relatively high signal-to-noise ratio are included in the set. And a setpoint for such a ratio could be used in a similar fashion instead of or in addition to the determined value of the ratio itself. The ratio could be $E_b/N_t$, $E_b/N_o$, $E_c/I_o$, or any other suitable such ratio. A similar approach could be used instead or in addition with RFER and/or RFER target, though, with respect to those values, active mobile stations having relatively low values would be those included in the set.

In an embodiment, as discussed above, a PCB behavior (i.e., pattern) could be factored in: for example, if a sufficient number of consecutive 1s, or perhaps a sufficient total number of 1s in some preceding time period had been sent to the mobile station, that mobile station could be included in the set. In an embodiment, as is also discussed above, identifying the set may be based at least in part on the quality of a forward-link component of an ongoing call of at least one active mobile station.

At step 204, with respect to each mobile station in the identified set, BTS 104 relaxes at least one reverse-link power-control setting from a respective first value to a respective second value, where each second value is, as compared with its corresponding first value, associated with an increased actual and/or maximum-allowed reverse-link transmission-power level.

In an embodiment, step 204 may involve lowering a RFER target for at least one active mobile station. In an embodiment, step 204 may involve raising a setpoint for a signal-to-noise-ratio (such as any ratio discussed herein, or any other) for at least one active mobile station. In an embodiment, step 204 may involve more aggressively relaxing at least one such setting for mobile stations in the identified set that have a relatively higher likelihood of experiencing a dropped call as compared with the rest of the mobile stations in the identified set.

At step 206, after relaxing at least one reverse-link power-control setting for each mobile station in the identified set, BTS 104 determines that the dropped-call rate on the carrier exceeds a first (lower) threshold, and responsively decreases the degree to which at least one such setting has been relaxed, at least in part by changing each such setting to a respective third value lying between the respective first and second values for that setting. In other words, the base station (e.g., BTS 104) backs off the relaxation of one or more settings to some extent. The base station continues to monitor the dropped-call rate, however.

At step 208, after decreasing the degree to which at least one reverse-link power-control setting has been relaxed, BTS 104 determines that the dropped-call rate now exceeds a higher threshold, and responsively drops at least one active call and/or blocks at least one request for a new call (e.g., a call-origination message and/or an inbound-handoff request, etc.).

In an embodiment, step 208 may involve BTS 104 selecting and carrying out a mixture of dropping active calls and blocking requests for new calls based at least in part on a ratio of the number of active mobile stations that are experiencing good communication quality to the number of active mobile stations that are experiencing poor communication quality, where communication quality could be measured based on RF metrics, retransmission requests, lost data, delay, and/or any other suitable metric for quality of a communication link.

In an embodiment, step 208 may involve BTS 104 selecting and carrying out a mixture of dropping active calls and blocking requests for new calls based at least in part on a total number of mobile stations in the identified set. As one option, if the set contains a relatively high number of mobile stations, BTS 104 may skew towards dropping, whereas if the set contains a relatively low number of mobile stations, BTS 104 may skew towards blocking.

In an embodiment, step 208 may involve BTS 104 selecting one or more calls to drop based at least in part on an individual contribution of at least one active mobile station to the overall RNR on the carrier in the coverage area. In an embodiment, BTS 104 sets a value for at least one reverse-link power-control setting for at least one active mobile station not in the identified set based at least in part on an individual contribution of such a mobile station to the overall RNR on the carrier in the coverage area.

In an embodiment, BTS 104 alternates between dropping active calls and blocking requests for new calls. In an embodiment, BTS 104 drops active calls and blocks requests for new calls according to a fixed ratio.

3. Conclusion

Various exemplary embodiments have been described above. Those skilled in the art will understand, however, that changes and modifications may be made to those examples without departing from the scope of the claims.

The invention claimed is:

1. A method comprising:
  a base station identifying a set of one or more active mobile stations to which the base station is providing service on a carrier in a coverage area that are more likely to experience a dropped call than are a remainder of active mobile stations on the carrier in the coverage area;
  with respect to each mobile station in the identified set, the base station relaxing at least one reverse-link power-control setting from a respective first value to a respective second value, wherein each second value is, as compared with its corresponding first value, associated with at least one of (i) an increased actual reverse-link transmission-power level and (ii) an increased maximum-allowed reverse-link transmission-power level;
  after relaxing at least one reverse-link power-control setting for each mobile station in the identified set, the base station determining that a dropped-call rate exceeds a first threshold, and responsively decreasing a degree to which at least one reverse-link power-control setting is relaxed, by changing each such setting to a respective third value lying between the respective first and second values for that setting; and
  after decreasing the degree to which at least one reverse-link power-control setting is relaxed, the base station determining that a dropped-call rate in the coverage area exceeds a second threshold higher than the first, and responsively carrying out at least one of: (i) dropping at least one active call and (ii) blocking at least one request for a new call.

2. The method of claim 1, wherein identifying the set comprises determining an individual contribution of at least one active mobile station to an overall reverse noise rise (RNR) on the carrier in the coverage area, wherein active mobile stations having a relatively high individual contribution are included in the set.

3. The method of claim 2, wherein determining the individual contribution of at least one active mobile station to the overall RNR comprises measuring at least one per-mobile-station contribution to RNR using a round-robin process.

4. The method of claim 2, wherein identifying the set further comprises comparing (i) the determined individual contribution of at least one active mobile station to the overall RNR with (ii) an expected average individual contribution of each active mobile station.

5. The method of claim 4, wherein the expected average individual contribution of each active mobile station is based at least in part on the loading equation.

6. The method of claim 1, wherein identifying the set comprises determining a signal-to-noise ratio for at least one active mobile station, wherein active mobile stations having a relatively high signal-to-noise ratio are included in the set.

7. The method of claim 6, wherein the signal-to-noise ratio is $E_b/N_t$, $E_b/N_o$, or $E_c/I_o$.

8. The method of claim 1, wherein identifying the set comprises determining a setpoint for a signal-to-noise ratio for at least one active mobile station, wherein active mobile stations having a relatively high setpoint are included in the set.

9. The method of claim 1, wherein identifying the set is based at least in part on a power-control-bit (PCB) pattern for at least one active mobile station.

10. The method of claim 1, wherein identifying the set comprises determining a reverse-link frame error rate (RFER) for at least one active mobile station, wherein active mobile stations having a relatively low RFER are included in the set.

11. The method of claim 1, wherein identifying the set comprises determining a reverse-link frame error rate (RFER) target for at least one active mobile station, wherein active mobile stations having a relatively low RFER target are included in the set.

12. The method of claim 1, wherein identifying the set is based at least in part on a quality of a forward-link component of an ongoing call of at least one active mobile station.

13. The method of claim 1, wherein relaxing at least one reverse-link power-control setting comprises lowering a reverse-link frame error rate (RFER) target for at least one active mobile station.

14. The method of claim 1, wherein relaxing at least one reverse-link power-control setting comprises raising a setpoint for a signal-to-noise-ratio for at least one active mobile station.

15. The method of claim 14, wherein the signal-to-noise ratio is $E_b/N_t$, $E_b/N_o$, or $E_c/I_o$.

16. The method of claim 1, wherein relaxing at least one reverse-link power-control setting comprises more aggressively relaxing at least one reverse-link power-control setting for mobile stations in the identified set having a relatively higher likelihood of experiencing a dropped call as compared with a remainder of mobile stations in the identified set.

17. The method of claim 1, wherein a request for a new call comprises a call-origination message or a request for an inbound handoff.

18. The method of claim 1, further comprising the base station selecting and carrying out a mixture of dropping active calls and blocking requests for new calls based at least in part on a ratio of a number of active mobile stations experiencing good communication quality to a number of active mobile stations experiencing poor communication quality.

19. The method of claim 1, further comprising the base station selecting and carrying out a mixture of dropping active calls and blocking requests for new calls based at least in part on a total number of mobile stations in the identified set.

20. The method of claim 1, further comprising the base station selecting one or more calls to drop based at least in part on an individual contribution of at least one active mobile station to an overall reverse noise rise (RNR) on the carrier in the coverage area.

21. The method of claim 1, wherein the base station alternates between dropping active calls and blocking requests for new calls.

22. The method of claim 1, wherein the base station drops active calls and blocks requests for new calls according to a fixed ratio.

23. The method of claim 1, further comprising the base station setting a value for at least one reverse-link power-control setting for at least one mobile station not in the identified set based at least in part on an individual contribution of such a mobile station to an overall reverse noise rise (RNR) on the carrier in the coverage area.

24. The method of claim 1, carried out with respect to at least two carriers.

25. A base station comprising:
a communication interface comprising a wireless-communication interface;
a processor; and
data storage comprising instructions executable by the processor for carrying out functions including:
identifying a set of one or more active mobile stations to which the base station is providing service on a carrier in a coverage area that are more likely to experience a dropped call than are a remainder of active mobile stations on the carrier in the coverage area;
with respect to each mobile station in the identified set, relaxing at least one reverse-link power-control setting from a respective first value to a respective second value, wherein each second value is, as compared with its corresponding first value, associated with at least one of (i) an increased actual reverse-link transmission-power level and (ii) an increased maximum-allowed reverse-link transmission-power level;
after relaxing at least one reverse-link power-control setting for each mobile station in the identified set, determining that a dropped-call rate exceeds a first threshold, and responsively decreasing a degree to which at least one reverse-link power-control setting is relaxed, by changing each such setting to a respective third value lying between the respective first and second values for that setting; and
after decreasing the degree to which at least one reverse-link power-control setting is relaxed, determining that a dropped-call rate in the coverage area exceeds a second threshold higher than the first, and responsively carrying out at least one of: (i) dropping at least one active call and (ii) blocking at least one request for a new call.

* * * * *